United States Patent
Tiemeyer

Patent Number: 6,114,792
Date of Patent: Sep. 5, 2000

[54] COMMUTATOR MOTOR WITH A MAGNETIC FIELD DEFLECTING MOVING CHARGE CARRIERS IN THE COMMUTATOR BRUSH

[75] Inventor: Peter Tiemeyer, Wuerzburg, Germany

[73] Assignee: Siemens Aktiengesellschaft, Munich, Germany

[21] Appl. No.: 09/313,187

[22] Filed: May 18, 1999

Related U.S. Application Data

[63] Continuation of application No. PCT/DE97/02543, Nov. 3, 1997.

[30] Foreign Application Priority Data

Nov. 18, 1996 [DE] Germany ............................ 196 47 625

[51] Int. Cl.⁷ .................................................. H02K 39/08
[52] U.S. Cl. ...................... 310/233; 310/220; 310/221; 310/222; 310/231; 310/239; 310/248
[58] Field of Search ..................... 310/233, 229, 310/230, 240, 238, 244, 243, 245, 246, 248, 51, 219, 220, 221, 222, 223, 224, 226

[56] References Cited

U.S. PATENT DOCUMENTS

| | | | |
|---|---|---|---|
| 3,648,089 | 3/1972 | DeWolf | 310/186 |
| 4,110,718 | 8/1978 | Odor et al. | 335/296 |
| 4,342,931 | 8/1982 | Grossmann et al. | 310/50 |
| 4,980,593 | 12/1990 | Edmundson | 310/154 |
| 5,481,150 | 1/1996 | Tanaka et al. | 310/249 |

FOREIGN PATENT DOCUMENTS

| | | |
|---|---|---|
| 287670 | 1/1915 | Germany . |
| 9106977 | 11/1992 | Germany . |
| 5510 | of 1901 | United Kingdom . |
| 140134 | 5/1920 | United Kingdom . |
| 167159 | 5/1922 | United Kingdom . |

*Primary Examiner*—Nestor Ramirez
*Assistant Examiner*—Thanh Lam
*Attorney, Agent, or Firm*—Sughrue, Mion, Zinn, Macpeak & Seas, PLLC

[57] ABSTRACT

In order to reduce the wear on the brushes (6) and thus extend the operating lives of the brushes and of the commutator motor, brush sparking on the trailing edges (6.2) of the brushes (6) is reduced a commutation magnetic field (M), produced for example by an additional magnet (4) placed axially behind the brushes (6), such that the magnetic field (M) deflects the moving charge carriers in the brushes (6), to thereby reduce the current density at the trailing edges (6.2) of the brushes (6).

17 Claims, 3 Drawing Sheets

COMMUTATOR MOTOR WITH A MAGNETIC FIELD DEFLECTING MOVING CHARGE CARRIERS IN THE COMMUTATOR BRUSH

This is a Continuation of International Application PCT/DE97/02543, with an international filing date of Nov. 3, 1997, the disclosure of which is incorporated into this application by reference.

FIELD OF AND BACKGROUND OF THE INVENTION

The invention relates to new and useful improvements to commutator motors. More particularly, the invention relates to arrangements for deflecting moving charge carriers in a brush for the commutator motor.

In a commutator motor, the operating current is normally supplied to the rotor winding via a first brush contacting the commutator, and is extracted again via a second brush, which is circumferentially offset on the commutator with respect to the first brush. The brushes are held either in so-called hammer brushholders or in so-called box brushholders. Their sliding surfaces are pressed, generally by means of spring pressure, against the surfaces of the laminates of the commutator and, as a result, are subject to wear. Some of this wear is caused by so-called brush sparking on the trailing edge of the brushes. This brush wear shortens the life of the brush system and adversely affects the motor operating characteristics.

British Patent Specification GB-A-167 159 is intended to avoid brush sparking in a commutator motor by deliberately keeping away from the brushes any stray flux between the stator winding at one axial end of the commutator, on the one hand, and a stator magnetic return path at the other axial end of the commutator, on the other hand, by means of separate flux guides which surround the brushholder and the brushes on the outside.

British Patent Specification GB-B 55 10 describes how undesirable brush sparking on the trailing edge can be counteracted by multilayer brushes, which have a higher electrical resistance brush located at a leaving edge of a brush that has a lower electrical resistance.

German Utility Model DE 91 06 977 U1 describes a commutator motor, particularly for driving motor vehicle accessories, in which, in order to prevent interference caused by brush noise, the brushes are split along a separating line (which runs essentially parallel to the direction of the operating current and the contact-pressure direction) into two sub-zone brushes. These two sub-zone brushes differ in material composition from one another, in such a manner that the sub-zone including the leading edge has a higher proportion of copper than the other sub-zone, that includes the trailing edge. Complex special manufacturing techniques are required to produce such two-zone brushes.

OBJECTS OF THE INVENTION

It is therefore a first object of the invention to provide a simple means to improve the life, i.e., the operating life, of motors with brush systems by reducing the brush wear, particularly by suppressing brush sparking on the trailing brush edge. Such an improvement is particularly important for universal motors which—owing to the so-called transformer emf—are subject to wear on the sliding surface of the brushes.

SUMMARY OF THE INVENTION

These and other objects are achieved by a commutator motor in accordance with the present invention. According to one formulation of the invention, the commutator motor includes:

a commutator arranged to rotate in a main rotation direction;

a brush which presses against the commutator in a longitudinal, contact-pressure direction, and through which an operating current flows essentially in the longitudinal, contact-pressure direction, wherein the brush has a leading edge and a trailing edge relative to the main rotation direction of the commutator; and an arrangement that produces a commutation magnetic field that is aligned essentially at a right angle to the longitudinal, contact-pressure direction in which the operating current flows; wherein charge carriers that are moved by the operating current are deflected so as to reduce a current density of the operating current on the trailing edge of the brush.

The additional commutation magnetic field according to the invention makes use of the so-called "Lorentz force", which is described, for example, in the textbook "Physik für Ingenieure" [Physics for Engineers] Verlag B. G. Teubner, Stuttgart 1980, page 248. This force is used to deflect the free charge carriers, which are moved to form the operating current, in order to increase the charge carrier concentration on the leading brush edge and to reduce the charge carrier concentration on the trailing brush edge. Some reductions in current lead to arcs, which can normally occur to an increased extent on the trailing brush edges during commutation. Such arcing is largely suppressed in the case of the present invention despite the use of only a conventional standard brush, or is displaced sufficiently far under the brush that only comparatively minor brush and commutator erosion need be accepted, resulting in a significant increase in the operating life of the brush system, and thus in the life of the commutator itself. Tests with DC motors using permanent magnet excitation, such as those provided for use in electrical drives in motor vehicles, have shown that the design of the commutator motor according to the invention allows brush lives to be increased by up to 50%.

According to advantageous refinements of the invention, the commutation magnetic field is produced by separate permanent magnets or electromagnets. It is especially desirable to produce the commutation magnetic field from from magnets which are present anyway in the motor for other reasons, such as for motor excitation, by making use of their stray fields which extend at the ends into the region of the commutator brushes.

The main rotation direction is defined as being that motor rotation direction in which, owing to increased current load and/or increased operational usage time, the brush wear is greater than in the potential opposite rotation direction. When an electromagnet is used to produce the commutation magnetic field, this electromagnet is advantageously switched off, or its poles are reversed, for the opposite rotation direction to the main rotation direction, so that the current density in the region near the trailing edge of the brush can be reduced in the opposite rotation direction as well.

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

DETAILED DESCRIPTION OF THE PREFERRED EMBODIMENTS

Figure 1:
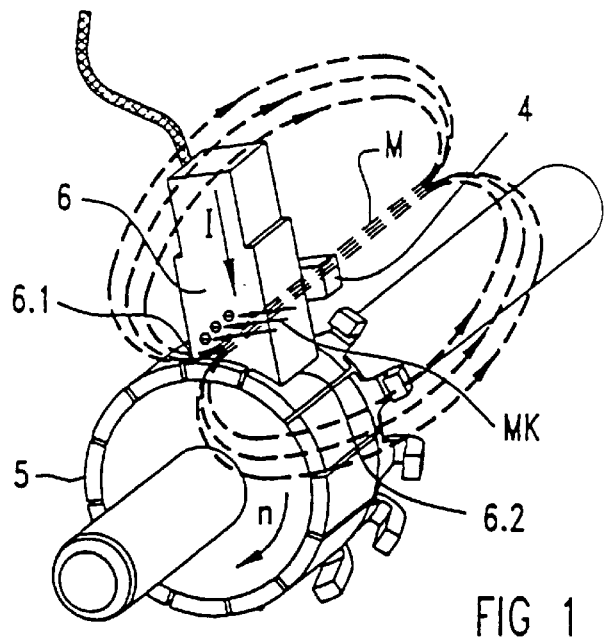
FIG. 1 illustrates the principle of the invention and specifically shows a perspective view of a commutator on which a brush slides, with a commutation magnetic field which is produced axially behind the brush by an additional permanent magnet and which forces the free charge carriers in the brush in the direction of the leading edge.

To illustrate the principle of the invention, FIG. 1 shows a perspective view of a commutator 5 whose main rotation direction "n" is clockwise, and against which a brush 6 slides. The brush 6 has a leading edge 6.1 and a trailing edge 6.2. An operating current I is supplied during operation of the commutator motor to a rotor winding that is connected to the commutator 5. This current I flows essentially in the brush longitudinal and contact-pressure direction and contains moving charge carriers in the form of electrons. According to the invention, these charge carriers are deflected in the direction of the leading edge 6.1, under the principle of the so-called "Lorentz force", with a magnetic force MK by the commutation magnetic field M of an additional permanent magnet 4, which is arranged axially behind the brush 6. As a result, a zone of reduced current density is produced at the trailing edge 6.2 of the brush 6.

FIGS. 2–6 show practical embodiments of the principle of the solution shown in FIG. 1 for a commutator motor having permanent magnet shells 2;2 arranged on the internal circumference of a motor housing 1. The motor additionally has a rotor shaft 3 which is mounted in a bearing bracket 1.1 on the stator side and has a commutator 5 and a laminated rotor stack 3.1, which is shown here without the windings in order to make the essential features of the invention clearer. The motor is assumed to have two poles in these embodiments, with two brushes that slide on the commutator 5 and are spaced apart from one another, to match the pole pitch, on the circumference of the commutator 5. Only one of these brushes is shown in each of FIGS. 2–4. Each of these brushes 6;6 can either be held by a brush arm (mounted such that it can pivot) of a hammer brushholder, or can be guided in a brush box of a box brushholder.

Figure 2:
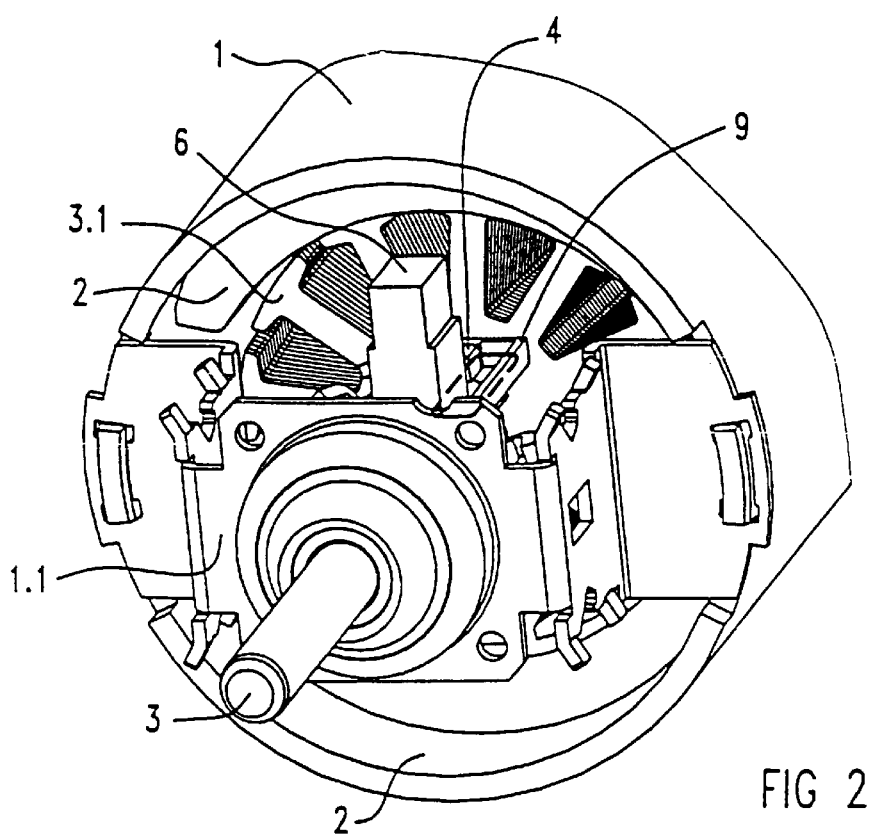
FIG. 2 shows a perspective view of the commutator end of a commutator motor having an additional permanent magnet arranged axially behind the brush, and having an additional flux guide.

In FIG. 2, an additional permanent magnet 4 is arranged axially behind the illustrated brush 6 and produces a commutation magnetic field M which, for the purposes of the present invention, deflects the free charge carriers of the brush current I in the direction of the leading edge of the brush. The magnetic lines of force are indicated by dashed lines. A flux guide 9 is provided to reinforce the desired magnetic field profile from the additional permanent magnet 4. This flux guide 9 extends axially on one side or both sides of the brush 6, and guides the magnetic flux back to the pole of the additional permanent magnet 4 that faces away from the brush 6.

Figure 3:
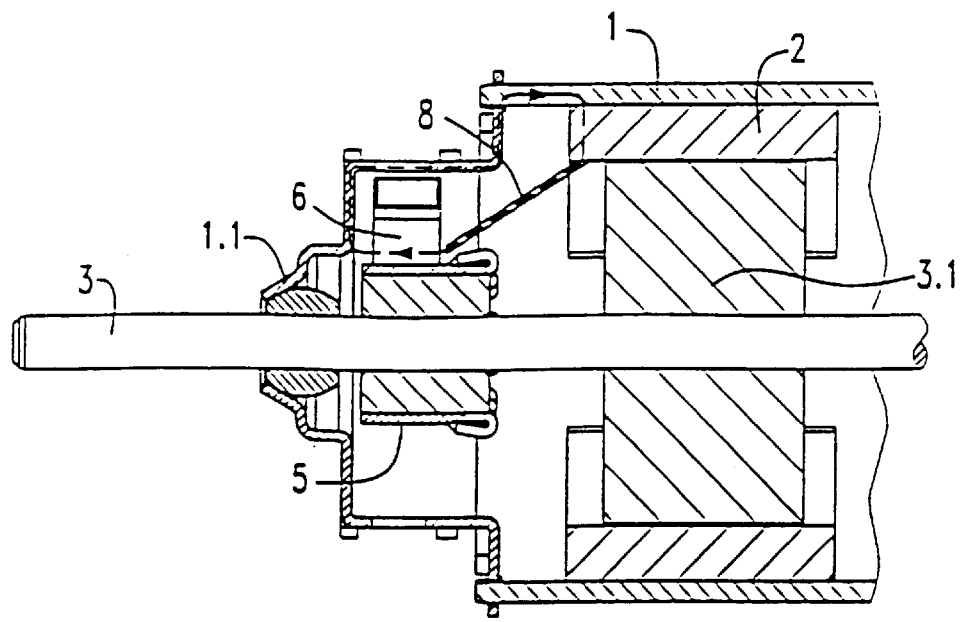
FIG. 3 shows an axial section through the commutator end of a commutator motor with permanent magnet shells used for stator excitation and with a commutation magnetic field derived from these permanent magnet shells via a flux guide.
Figure 4:
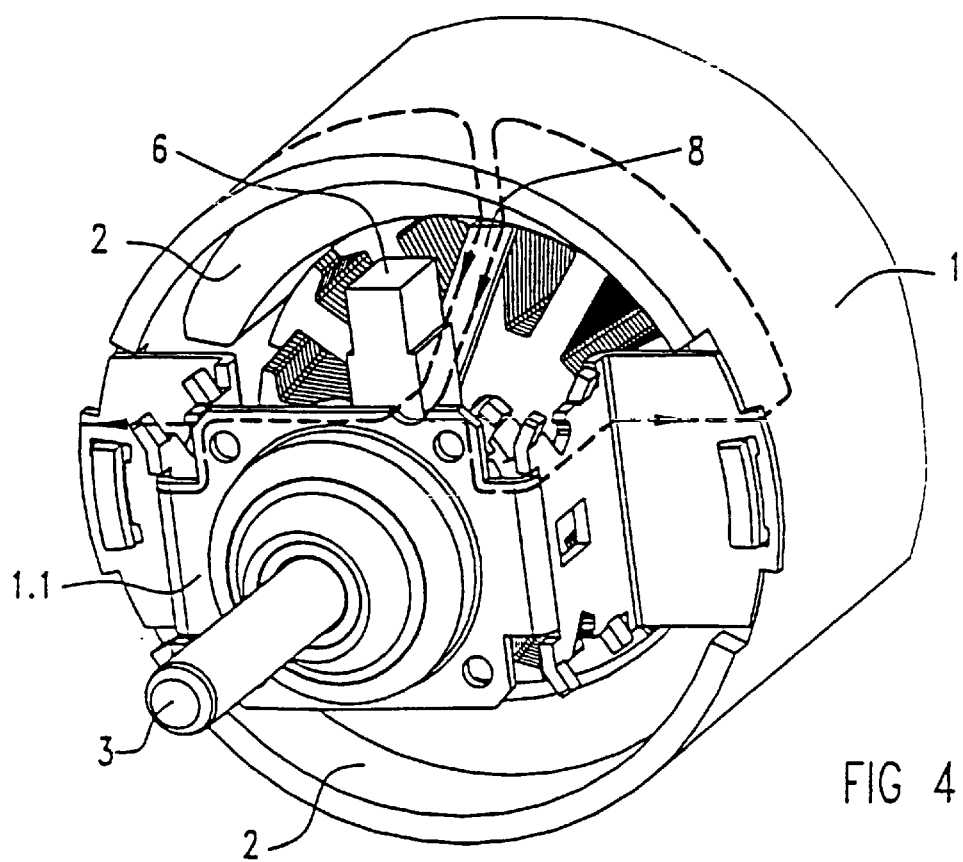
FIG. 4 shows a perspective view of the commutator end of the commutator motor shown in FIG. 3.

FIGS. 3 and 4 respectively show an axial section and a perspective view of the commutator end of a commutator motor, in which permanent magnet shells 2;2 are used for the commutation magnetic field M. Such an arrangement is particularly advantageous, since the permanent magnet shells are already arranged on the inside of the motor housing 1, and thus present in the motor, for the purpose of excitation, and since specific use can be made of the shells' stray field at the ends. According to a refinement of the invention, this is in turn advantageously assisted by a flux guide 8, which pointedly guides the stray field to achieve the intended deflection of the freely moving charge carriers to the respective brush 6. According to another refinement of the invention, motor components which are present in any case, in particular a bearing bracket 1.1 at the commutator end and the motor housing 1, are used as well to guide both directions of the commutation magnetic field M in the desired manner. Once again, the commutation magnetic field M is indicated by dashed magnetic lines of force.

Figure 5:
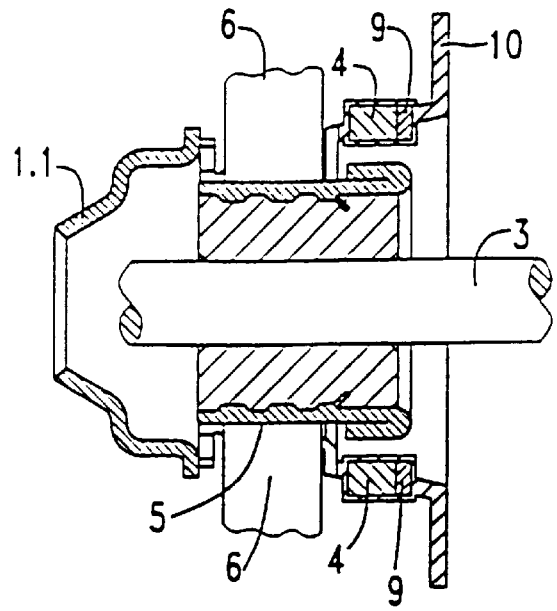
FIG. 5 shows an axial section of the commutator end of a hammer brushholder commutator motor, whose additional permanent magnet (which produces the commutation magnetic field) and associated flux guide are held in a conventional icing protection cap.

FIG. 5 shows another embodiment in which the additional permanent magnets 4 and their flux guides 9 are held in a manner which is particularly simple to produce and assemble. Specifically, the magnets 4 and flux guides 9 are held in an icing protection cap 10, known per se from e.g. European Patent EP 0 724 323 B1, which covers the surface of the laminates of the commutator 5 and is held on the motor housing 1 at the motor end. The additional permanent magnet 4 and the flux guide 9 are expediently both molded into the plastic icing protection cap 10 at the time the cap 10 is injection molded.

Figure 6:
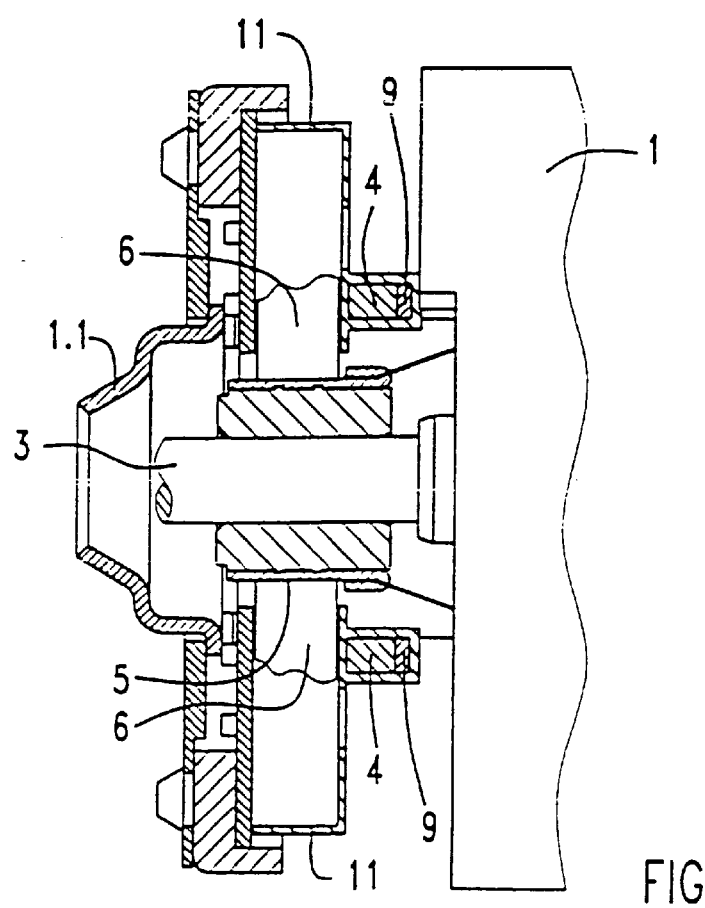
FIG. 6 shows an axial section through the commutator end of a box brushholder commutator motor with a holder (which is integrated in a brush box) for an additional magnet, which produces the commutation magnetic field, and its associated flux guide.

Finally, FIG. 6 shows an embodiment in which the additional permanent magnets 4 and flux guides 9 are held, in a manner which is likewise advantageous for production and assembly, in brush boxes 11 of a hammer brushholder which holds the brushes 6.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A commutator motor, comprising:
    a commutator arranged to rotate in a main rotation direction;
    a brush which presses against said commutator in a longitudinal, contact-pressure direction, and through which an operating current flows essentially in the longitudinal, contact-pressure direction;

wherein said brush has a leading edge and a trailing edge relative to the main rotation direction of said commutator; and an arrangement that produces a commutation magnetic field that is aligned essentially at a right angle to the longitudinal, contact-pressure direction in which the operating current flows;

wherein charge carriers that are moved by the operating current are deflected by the commutation magnetic field so as to reduce a current density of the operating current on the trailing edge of said brush.

2. A commutator motor as claimed in claim 1, wherein the commutator motor is a universal motor.

3. A commutator motor as claimed in claim 1, wherein said arrangement producing said commutation magnetic field comprises at least one magnet associated with said brush.

4. A commutator motor as claimed in claim 3, wherein said magnet is arranged behind said brush in an axial direction defined by an axis of rotation of said commutator.

5. A commutator motor as claimed in claim 4, wherein said magnet is a permanent magnet.

6. A commutator motor as claimed in claim 3, wherein said magnet is an electromagnet.

7. A commutator motor as claimed in claim 6, wherein said electromagnet is switched off when said commutator rotates in a direction opposite to the main rotational direction.

8. A commutator motor as claimed in claim 6, wherein said electromagnet has poles that are reversible when said commutator rotates in a direction opposite to the main rotational direction.

9. A commutator motor as claimed in claim 1, wherein:

said arrangement comprises permanent magnets arranged on a stator side of the commutator motor and producing an operating excitation for said commutator motor; and wherein said commutation magnetic field is derived from said permanent magnets.

10. A commutator motor as claimed in claim 9, further comprising a motor housing;

wherein said permanent magnets comprise permanent magnet shells supported on said motor housing.

11. A commutator motor as claimed in claim 1, wherein said arrangement comprises:

a magnet producing said commutation magnetic field; and a flux guide arranged between said magnet and said brush.

12. A commutator motor as claimed in claim 11, wherein said flux guide is at least a portion of a bearing bracket located on a commutator side of the commutator motor.

13. A commutator motor as claimed in claim 11, wherein said flux guide is at least a portion of a motor housing located on a commutator side of the commutator motor.

14. A commutator motor as claimed in claim 1, further comprising an icing protection cap covering a surface of said commutator and held on a stator side of the commutator motor, wherein said arrangement comprises a magnet supported by said icing protection cap and producing said commutation magnetic field.

15. A commutator motor as claimed in claim 14, wherein said arrangement further comprises a flux guide supported by said icing protection cap and channeling said commutation magnetic field.

16. A commutator motor, comprising:

a commutator arranged to rotate in a main rotation direction;

a brush comprising a leading edge and a trailing edge relative to the main rotation direction of said commutator, wherein said leading edge and said trailing edge contact said commutator, and wherein an operating current flows through said brush; and a magnet producing a commutation magnetic field that deflects charge carriers moved by the operating current from said trailing edge of said brush.

17. A commutator motor as claimed in claim 16, further comprising a flux guide that directs the commutation magnetic field to be essentially orthogonal to the operating current at least in an area of said brush.

* * * * *